United States Patent
Suda

(10) Patent No.: US 10,328,675 B2
(45) Date of Patent: Jun. 25, 2019

(54) MULTILAYER FILM AND WOUND BODY

(71) Applicant: ZEON CORPORATION, Chiyoda-ku, Tokyo (JP)

(72) Inventor: Kazuya Suda, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/311,657

(22) PCT Filed: May 26, 2015

(86) PCT No.: PCT/JP2015/065117
§ 371 (c)(1),
(2) Date: Nov. 16, 2016

(87) PCT Pub. No.: WO2015/182614
PCT Pub. Date: Dec. 3, 2015

(65) Prior Publication Data
US 2017/0080689 A1      Mar. 23, 2017

(30) Foreign Application Priority Data

May 30, 2014 (JP) .................................. 2014-112927

(51) Int. Cl.
*G02B 1/14* (2015.01)
*B32B 27/06* (2006.01)
(Continued)

(52) U.S. Cl.
CPC ................ *B32B 27/06* (2013.01); *B32B 7/02* (2013.01); *B32B 7/06* (2013.01); *B32B 7/12* (2013.01);
(Continued)

(58) Field of Classification Search
CPC .... G02B 5/02–0294; G02B 5/18–1895; G02B 5/28–289; G02B 1/11;
(Continued)

(56) References Cited

U.S. PATENT DOCUMENTS 5,773,126 A * 6/1998 Noritake .................. B05D 1/42
428/143
5,968,666 A * 10/1999 Carter ................... B29C 55/023
428/480
(Continued)

FOREIGN PATENT DOCUMENTS

JP      2004237451 A *  8/2004
JP      2008102271 A *  5/2008 ............. G02B 1/105
(Continued)

OTHER PUBLICATIONS

Dec. 6, 2016, International Preliminary Report on Patentability issued in the International Patent Application No. PCT/JP2015/065117.

*Primary Examiner* — Z. Jim Yang
(74) *Attorney, Agent, or Firm* — Kenja IP Law PC

(57) ABSTRACT

The present invention provides a long-length multilayer film including a long-length optical film and a long-length protective, film that is releasable from the long-length optical film, wherein a three-dimensional center-line average roughness R1 of a surface of the optical film opposite to a surface on a side of the protective film, a three-dimensional center-line average roughness R2 of a surface of the protective film opposite to a surface on a side of the optical film, a tensile elastic modulus M1 in a lengthwise direction of the optical film, and a tensile elastic modulus M2 in a lengthwise direction of the protective film satisfy predetermined relationships: and a wound body of the multilayer film.

8 Claims, 1 Drawing Sheet

(51) Int. Cl.
  *B32B 7/12* (2006.01)
  *G02B 5/30* (2006.01)
  *G02B 27/00* (2006.01)
  *G02B 1/18* (2015.01)
  *B32B 7/02* (2019.01)
  *B32B 7/06* (2019.01)
  *B32B 27/08* (2006.01)
  *B32B 27/20* (2006.01)
  *B32B 27/30* (2006.01)
  *B32B 27/36* (2006.01)

(52) U.S. Cl.
  CPC ............. *B32B 27/08* (2013.01); *B32B 27/20* (2013.01); *B32B 27/302* (2013.01); *B32B 27/308* (2013.01); *B32B 27/36* (2013.01); *G02B 1/14* (2015.01); *G02B 1/18* (2015.01); *G02B 5/3083* (2013.01); *G02B 27/0006* (2013.01); *B32B 2255/10* (2013.01); *B32B 2255/26* (2013.01); *B32B 2264/102* (2013.01); *B32B 2264/104* (2013.01); *B32B 2307/40* (2013.01); *B32B 2307/518* (2013.01); *B32B 2307/538* (2013.01); *B32B 2307/54* (2013.01); *B32B 2307/732* (2013.01); *B32B 2307/748* (2013.01); *B32B 2551/00* (2013.01); *G02B 5/305* (2013.01); *Y10T 428/24355* (2015.01); *Y10T 428/24364* (2015.01)

(58) Field of Classification Search
  CPC .................. G02B 1/111; G02B 1/118; B32B 2307/40–422; B32B 2307/538; Y10T 428/24355; Y10T 428/24364
  See application file for complete search history.

(56) References Cited

U.S. PATENT DOCUMENTS

| | | | | |
|---|---|---|---|---|
| 6,319,589 B1* | 11/2001 | Kobayashi | B29C 55/023 | 428/141 |
| 6,376,043 B1* | 4/2002 | Handa | B32B 27/34 | 428/141 |
| 6,512,562 B1* | 1/2003 | Kobayashi | C08J 7/12 | 349/122 |
| 2001/0051257 A1* | 12/2001 | Kobayashi | B29C 55/023 | 428/216 |
| 2001/0055674 A1* | 12/2001 | Hellman | B32B 27/36 | 428/216 |
| 2002/0106506 A1* | 8/2002 | Kumano | G02B 1/105 | 428/343 |
| 2003/0030372 A1* | 2/2003 | Masaki | G02B 1/105 | 313/512 |
| 2003/0165753 A1* | 9/2003 | Suzuki | B41M 7/0027 | 430/14 |
| 2004/0091642 A1* | 5/2004 | Murakami | G02B 5/0215 | 428/1.31 |
| 2006/0198991 A1* | 9/2006 | Takiyama | B29C 39/18 | 428/172 |
| 2006/0210768 A1* | 9/2006 | Masuda | B29C 33/68 | 428/141 |
| 2006/0216439 A1* | 9/2006 | Shimizu | B29C 41/26 | 428/1.31 |
| 2006/0222814 A1* | 10/2006 | Takahashi | C08J 7/04 | 428/141 |
| 2006/0228092 A1* | 10/2006 | Hebrink | B32B 3/26 | 385/147 |
| 2006/0279679 A1* | 12/2006 | Fujisawa | G02B 5/0221 | 349/116 |
| 2007/0030430 A1* | 2/2007 | Inoue | G02B 1/111 | 349/137 |
| 2007/0103910 A1* | 5/2007 | Brickey | G02B 5/0242 | 362/311.04 |
| 2007/0134459 A1* | 6/2007 | Hubert | B32B 37/00 | 428/40.1 |
| 2007/0153384 A1* | 7/2007 | Ouderkirk | B32B 33/00 | 359/487.02 |
| 2009/0002820 A1* | 1/2009 | Okano | G02B 1/105 | 359/483.01 |
| 2009/0086126 A1* | 4/2009 | Ohgaru | G02B 1/105 | 349/96 |
| 2010/0024969 A1* | 2/2010 | Wang | C08J 7/04 | 156/239 |
| 2010/0104879 A1* | 4/2010 | Okano | G02B 1/105 | 428/447 |
| 2010/0188622 A1* | 7/2010 | Suzuki | C08K 5/107 | 349/96 |
| 2010/0323156 A1* | 12/2010 | Yutou | G02B 1/105 | 428/141 |
| 2011/0070400 A1* | 3/2011 | Isaki | B32B 27/08 | 428/141 |
| 2011/0128629 A1* | 6/2011 | Takahashi | G02B 1/118 | 359/601 |
| 2012/0003426 A1* | 1/2012 | Ying | B32B 15/20 | 428/141 |
| 2013/0011614 A1* | 1/2013 | Nagae | B32B 27/08 | 428/143 |
| 2013/0052418 A1* | 2/2013 | Asada | B32B 7/12 | 428/141 |
| 2013/0265529 A1* | 10/2013 | Wakizaka | G02B 5/30 | 349/96 |
| 2014/0120377 A1* | 5/2014 | MacKerron | B32B 27/36 | 428/847.4 |
| 2014/0205805 A1* | 7/2014 | Takihara | G02B 1/105 | 428/142 |
| 2014/0233104 A1* | 8/2014 | Nagahama | C03C 17/36 | 359/585 |
| 2014/0335310 A1* | 11/2014 | Matsumoto | G02B 5/3083 | 428/141 |
| 2014/0363628 A1* | 12/2014 | Nakai | B32B 7/06 | 428/141 |
| 2015/0002924 A1* | 1/2015 | Ono | B32B 38/0008 | 359/350 |
| 2015/0015950 A1* | 1/2015 | Schmidt | C09D 4/00 | 359/489.07 |
| 2015/0086749 A1* | 3/2015 | Fukaya | B28B 1/30 | 428/141 |
| 2015/0093542 A1* | 4/2015 | Matsumoto | B32B 7/12 | 428/142 |
| 2015/0099094 A1* | 4/2015 | Suzuki | B05D 3/12 | 428/141 |
| 2015/0114551 A1* | 4/2015 | Moritz | B44C 1/14 | 156/233 |
| 2015/0168609 A1* | 6/2015 | Fukui | B29C 33/424 | 359/601 |
| 2015/0183945 A1* | 7/2015 | Shiraishi | C08J 5/18 | 359/513 |
| 2015/0273792 A1* | 10/2015 | Tazawa | C09J 7/385 | 428/142 |
| 2015/0331188 A1* | 11/2015 | Maeda | G02B 6/132 | 385/131 |
| 2015/0368518 A1* | 12/2015 | Kawai | C09J 7/35 | 156/247 |
| 2016/0070383 A1* | 3/2016 | Toyoshima | H01L 27/323 | 345/174 |
| 2016/0097888 A1* | 4/2016 | Lim | G02B 5/305 | 349/12 |
| 2016/0109622 A1* | 4/2016 | Yoshida | B29C 45/14811 | 359/507 |
| 2016/0151995 A1* | 6/2016 | Kitano | B32B 7/06 | 428/186 |
| 2016/0229170 A1* | 8/2016 | Cho | G02B 1/14 | |
| 2016/0313480 A1* | 10/2016 | Lee | B32B 27/30 | |
| 2016/0363699 A1* | 12/2016 | Kunai | G02B 1/10 | |

(56) References Cited

U.S. PATENT DOCUMENTS

2017/0100923 A1* 4/2017 Liu .......................... B32B 7/06
2018/0052255 A1* 2/2018 Shimode ................. B32B 27/00

FOREIGN PATENT DOCUMENTS

| JP | 2010243903 A | * | 10/2010 | ............. B32B 27/36 |
| JP | 2010247513 A | * | 11/2010 | ............. G02B 1/105 |
| JP | 2011112945 A |   | 6/2011  |                         |
| JP | 2012061712 A | * | 3/2012  |                         |
| WO | WO-2012128239 A1 | * | 9/2012 | ............. G02B 1/105 |
| WO | WO-2013100044 A1 | * | 7/2013 | ............. B32B 27/36 |

\* cited by examiner

MULTILAYER FILM AND WOUND BODY

FIELD

The present invention relates to a multilayer film and a wound body.

BACKGROUND

It has been known to provide an optical film such as a phase difference film, a polarizing film, and a brightness enhancing film to a display device such as a liquid crystal display device. Such an optical film is produced collectively in a certain amount into a long-length shape from the viewpoint of production efficiency, and the long-length film is stored as a wound bode. After storage for a fixed period, the long-length film is unrolled from the wound body. If necessary, the long-length film is bonded to another long-length film by a roll-to-roll method or the like, and later subjected to shaping such as punching. The long-length film is then incorporated into a liquid crystal display device or the like, and used.

A technique of bonding a protective film to a long-length optical film has been known for improvement of protection and handling properties of the optical film during winding of the long-length optical film (see Patent Literature 1). The protective film is bonded to the optical film to form a multilayer film, and the multilayer film is wound to form a wound body, with which an advantageous effect can be obtained. For example, the handleability during winding and unrolling can be improved, damage caused by sticking of the optical film to another optical film can be prevented, and the optical film can be protected against dust and the like. The protective film used in such applications is often prepared as a long-length film before bonding to the optical film for convenience of operation. Such a long-length film is usually wound and stored as a wound body, and unrolled from the wound body before bonding to the optical film, and then used.

CITATION LIST

Patent Literature

Patent Literature 1: Japanese Patent Application Laid-Open No. 2011-112945 A

SUMMARY

Technical Problem

When the multilayer film is wound to form a wound body, defects such as a gauge band (band-shaped concave or convex part that is formed at a specific portion in a width direction of the wound body) and a winding wrinkle may be caused. When such defects occur, the optical film may be deformed, resulting in optical defects. In an actual commercial transaction, a product value may not be highly evaluated for such a reason that a wound shape is not good even if there is no loss in terms of performance. Therefore, a technique of suppressing such defects and keeping good wound shape of the wound body of the optical film is required.

In order to decrease the defects of the wound body, a protective film having a specific property may be used as the protective film constituting the multilayer film. For example, a protective film that has a roughness equal to or higher than a predetermined level on a surface opposite to a surface to be bonded to the optical film in the multilayer film and that has a low elastic modulus so as to be deformed easily can be used. When such a protective film is used, the amount of air involved during winding of the multilayer film may be decreased, and as a result, the defects such as a gauge band and a winding wrinkle may be suppressed.

However, when such a protective film is used, an undesired concavo-convex shape may be formed on a surface of the optical film due to a phenomenon such as transfer of the concavo-convex shape to the surface of the protective film (dents, projections, or the both on the surface). Such a concavo-convex shape may result in an optical defect.

An object of the present invention is therefore to provide a multilayer film in which occurrence of defects such as a gauge band and a winding wrinkle in a wound body is suppressed and formation of the undesired concavo-convex shape on a surface of an optical film is suppressed.

Another object of the present invention is to provide a wound body of a multilayer film in which occurrence of defects such as a gauge band and a winding wrinkle is suppressed and formation of the undesired concavo-convex shape on a surface of an optical film is suppressed.

Solution to Problem

The present inventor has conducted research on this regard, and has found that the aforementioned objects can be achieved by setting the surface roughness and the elastic modulus of the optical film and the protective film and the ratios thereof within predetermined ranges. The present inventor has found in particular that, by using a protective film having a tensile elastic modulus higher than a range that has been considered suitable and also by setting the tensile elastic modulus of the optical film, the surface roughness of the optical film and the protective film, and the ratio in the tensile elastic modulus and the ratio in the surface roughness therebetween within predetermined ranges, defects such as gauge band and winding wrinkle may be suppressed and furthermore, undesired concavo-convex shape on the surface of the optical film may be suppressed, whereby the present invention has been achieved. That is, according to the present invention, the following (1) to (5) are provided.

(1) A long-length multilayer film comprising a long-length optical film and a long-length protective film that is releasable from the long-length optical film, wherein a three-dimensional center-line average roughness $R1$ of a surface of the optical film opposite to a surface on a side of the protective film, a three-dimensional center-line average roughness $R2$ of a surface of the protective film opposite to a surface on a side of the optical film, a tensile elastic modulus $M1$ in a lengthwise direction of the optical film, and a tensile elastic modulus $M2$ in a lengthwise direction of the protective film satisfy relationships of the following formulae (1) to (6):

$$0.01\ \mu m \leq R1 \leq 0.05\ \mu m \tag{1}$$

$$0.01\ \mu m \leq R2 \leq 0.2\ \mu m \tag{2}$$

$$1{,}500\ \text{MPa} \leq M1 \leq 3{,}000\ \text{MPa} \tag{3}$$

$$2{,}500\ \text{MPa} \leq M2 \leq 6{,}000\ \text{MPa} \tag{4}$$

$$1.0 \leq R2/R1 \leq 5.0 \tag{5, and}$$

$$1.0 \leq M2/M1 \leq 3.0 \tag{6}$$

(2) The multilayer film according to (1), wherein the optical film has a thickness of 15 to 50 µm.

(3) The multilayer film according to (1) or (2), wherein the optical film is a multilayer film having a layer structure of 'b' layer/'a' layer/'b' layer, the 'a' layer is a layer formed from a resin containing a polystyrene-based polymer, and the 'b' layer is a layer formed from a resin containing a poly (methyl methacrylate) polymer.

(4) The multilayer film according to any one of (1) to (3), wherein the protective film includes an adhesive layer that adheres to the optical film, and also includes a back surface layer that is disposed on a side of the adhesive layer opposite to the optical film and that does not adhere to the optical film.

(5) The multilayer film according to (4), wherein the back surface layer is a layer formed from a resin containing a polymer and the resin contains particles.

(6) The multilayer film according to (5), wherein a ratio of the particles in a total amount of the resin forming the back surface layer is 0.05% by weight or more and 1.0% by weight or less.

(7) The multilayer film according to (5) or (6), wherein the particles have a particle diameter of 0.01 to 10 µm.

(8) The multilayer film according to any one of (i) to (7), wherein the back surface layer has a thickness that satisfies a ratio of a thickness of the adhesive layer relative to that of the back surface layer (adhesive layer/back surface layer) of 1/40 or more and 1/1 or less.

(9) A wound body formed by winding the multilayer film according to any one of (1) to (8) into a roll shape.

Advantageous Effects of Invention

In the multilayer film of the present invention, since occurrence of defects such as a gauge band and a winding wrinkle in a wound body is suppressed and formation of the undesired concavo-convex shape on a surface of an optical film is suppressed, the multilayer film can be suitable for storage and transport as the wound body.

In the wound body of the present invention, since occurrence of defects such as a gauge band and a winding wrinkle is suppressed and formation of the undesired concavo-convex shape on the surface of the optical film is suppressed, the wound body can be made suitable for storage and transport of the multilayer film.

DESCRIPTION OF EMBODIMENTS

Hereinafter, the present invention will be described in detail with reference to embodiments and examples. However, the present invention is not limited to the embodiments and examples described below. The present invention may be optionally modified without departing from the scope of claims of the present invention and equivalents thereto.

In this application, a "long-length" film means a film having a length that is at least 200 times the width thereof. The long-length film has a length that is preferably 300 times or more the width thereof, and can specifically have a length to be wound up into a roll shape for storage and transport. The upper limit of the length is not particularly limited, and for example, can be 10,000 times or less the width thereof.

[1.1. Multilayer Film: Summary]

The multilayer film of the present invention includes a long-length optical film and a long-length protective film that is releasable from the long-length optical film. The multilayer film of the present invention usually includes one layer of the long-length optical film and one layer of the long-length protective film and has a structure in which the layers are bonded to each other.

Figure 1:
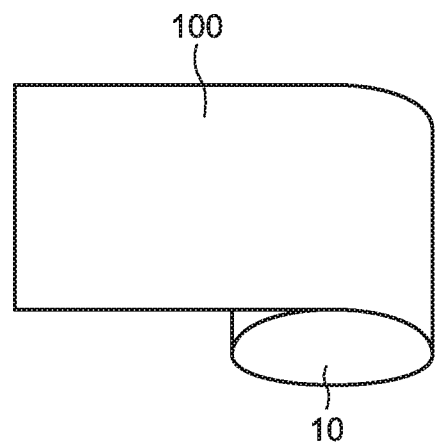
FIG. 1 is a schematic view schematically showing a wound body formed by winding a multilayer film according to an embodiment of the present invention.
Figure 2:
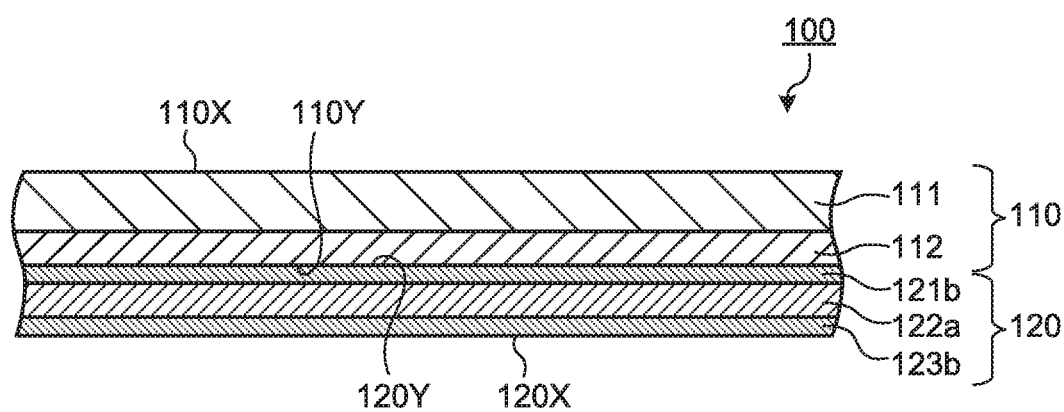
FIG. 2 is a cross-sectional view schematically shoving a cross section of the multilayer film according to the embodiment of the present invention.

FIG. 1 is a schematic view schematically showing a wound body formed by winding a multilayer film according to an embodiment of the present invention. FIG. 2 is a cross-sectional view schematically showing a cross section of the multilayer film according to the embodiment of the present invention.

As shown in FIG. 1, a wound body 10 is formed by winding a multilayer film 100 into a roll shape. As shown in FIG. 2, the multilayer film 100 is a film including a long-length optical film 120 and a long-length protective film 110 that is releasably bonded to the optical film 120.

[1.2. Properties of Multilayer Film]

In the multilayer film of the present invention, a three-dimensional center-line average roughness R1 of a surface of the optical film opposite to a surface on a side of the protective film, a three-dimensional center-line average roughness R2 of a surface of the protective film opposite to a surface on a side of the optical film, a tensile elastic modulus M1 in a lengthwise direction of the optical film, and a tensile elastic modulus M2 in a lengthwise direction of the protective film satisfy relationships of the following formulae (1) to (6):

$$0.01 \ \mu m \leq R1 \leq 0.05 \ \mu m \quad (1),$$

$$0.01 \ \mu m \leq R2 \leq 0.2 \ \mu m \quad (2),$$

$$1{,}500 \ MPa \leq M1 \leq 3{,}000 \ MPa \quad (3),$$

$$2{,}500 \ MPa \leq M2 \leq 6{,}000 \ MPa \quad (4),$$

$$1.0 \leq R2/R1 \leq 5.0 \quad (5), \text{ and}$$

$$1.0 \leq M2/M1 \leq 3.0 \quad (6).$$

Explaining with reference to an example of FIG. 2, R1 is a three-dimensional center-line average roughness of a surface 120X of the optical film 120 opposite to a surface 120Y on a side of the protective film R2 is a three-dimensional center line average roughness of a surface 110X of the protective film 110 opposite to a surface 110Y on a side of the optical film.

Hereinafter, the surface of the optical film on the side of the protective film may be referred to as a front surface of the optical film, and the surface of the optical film opposite to the surface on the side of the protective film may be referred to as a back surface of the optical film. The surface of the protective film on the side of the optical film may be referred to as a front surface of the protective film, and the surface of the protective film opposite to the surface on the side of the optical film may be referred to as a back surface of the protective film.

As shown in the formula (1), the three-dimensional center-line average roughness R1 of the back surface of the optical film is 0.01 µm or more and 0.05 µm or less. R1 is preferably 0.04 µm or less. When R1 is less than 0.01 µm, the amount of air involved during winding of the multilayer film for forming the wound body is decreased, and defects such as a gauge band are likely to occur. When R1 exceeds 0.05 μm, the amount of air involved during winding of the multilayer film for forming the wound body is excessively increased, and winding deviation is likely to occur.

As shown in the formula (2), the three-dimensional center-line average roughness R2 of the back surface of the protective film is 0.01 μm or more and 0.20 μm or less. R2 is preferably 0.02 μm or more, and more preferably 0.03 μm or more, and is preferably 0.18 μm or less, and more preferably 0.15 μm or less. When R2 is less than 0.01 μm, the amount of air involved during winding the multilayer film for forming the wound body is decreased, and defects such as a gauge band are likely to occur. When R2 exceeds 0.20 μm, an undesired concavo-convex shape is likely to be transferred from the protective film to the optical film.

As shown in the formula (5), R2/R1 that is the ratio of R2 relative to R1 is 1.0 or more and 5.0 or less. R2/R1 is preferably 1.5 or more. On the other hand, R2/R1 is preferably 4.5 or less.

When R1 and R2 fall within the aforementioned ranges and the value of R2/R1 is equal to or more than the lower limit described above, the amount of air involved during formation winding the multilayer film for forming the wound body is decreased, and as a result, defects such as a gauge band and a winding wrinkle can be suppressed. When R1 and R2 fall within the aforementioned ranges and the value of R2/R1 is equal to or less than the upper limit described above, transfer of the concavo-convex shape of the protective film to the optical film can be suppressed, and formation of the undesired concavo-convex shape on the surface of the optical film can be suppressed. When the values of R1 and R2 are not changed before and after bonding of the optical film and the protective film, the three-dimensional center-line average roughnesses of back surfaces of the optical film and the protective film before the bonding may be measured as R1 and R2, respectively. The three-dimensional center-line average roughness can be measured by a surface roughness tester (product name "SJ400" manufactured by Mitutoyo Corporation) in accordance with JIS B 0601:1994.

As shown in the formula (3), the tensile elastic modulus M1 in the lengthwise direction of the optical film is 1,500 MPa or more and 3,000 MPa or less. M1 is preferably 1,600 MPa or more, and more preferably 1,800 MPa or more, and is preferably 2,700 MPa or less, and more preferably 2,500 MPa or less. When M1 is less than 1,500 MPa, outer appearance defects such as a winding wrinkle occur. When M1 exceeds 3,000 MPa, an undesired impression derived from a foreign matter is likely to occur.

As shown in the formula (4), the tensile elastic modulus M2 in the lengthwise direction of the protective film is 2,500 MPa or more and 6,000 MPa or less. M2 is preferably 3,000 MPa or more, and more preferably 3,500 MPa or more, and is preferably 5,500 MPa or less, and more preferably 5,000 MPa or less. When M2 is less than 2,500 MPa, outer appearance defects such as a winding wrinkle occur. When M2 exceeds 6,000 MPa, an undesired concavo-convex shape may be strongly transferred to the optical film.

As shown in the formula (6), M2/M1 that is the ratio of M2 relative to M1 is 1.0 or more and 3.0 or less. M2/M1 is preferably 1.5 or more. On the other hand, M2/M1 is preferably 2.5 or less.

When M1 and M2 fall within the aforementioned ranges and the value of M2/M1 is equal to or more than the lower limit described above, the stiffness of the multilayer film can be a suitable and high value. As a result, a wound body having good outer appearance can be formed. When M1 and M2 fall within the aforementioned ranges and the value of M2/M1 is equal to or less than the upper limit described above, transfer of the concavo-convex shape of the protective film to the optical film can be suppressed, and formation of the undesired concavo-convex shape on the surface of the optical film can be suppressed. The tensile elastic modulus can be measured by a tensile tester (Model 5564 digital material testing system manufactured by Instron Corporation) in accordance with JIS K 7113, The tensile elastic moduli of the optical film and the protective film can be measured before they are bonded to form the multilayer film. When the protective film includes a release film for protecting an adhesion surface and the protective film is bonded to the optical film after releasing the release film thereby obtaining the multilayer film, the tensile elastic modulus of the protective film in which such a release film is released is measured.

The width and length of the multilayer film are not particularly limited. The width and length thereof can be a width and a length that fit the width and length of the optical film to be protected and stored and are suitable to be formed as a wound body and stored as the wound body. For example, the width of the multilayer film is preferably 800 mm or more, and more preferably 1,000 mm or more. In general, in a wound body formed by winding a film having a greater width, a wrinkle or a gauge band is likely to occur. However, the multilayer film of the present invention can be wound in a favorable wound shape even when it has a greater width. The upper limit of the width of the multilayer film can be usually 2,500 mm or less.

[1.3. Optical Film]

The optical film constituting the multilayer film can be any long-length film used in optical applications. Examples of the optical film may include a phase difference film, a polarizing film, a brightness enhancing film, a light diffusive film, a light condensing film, and a reflecting film.

The material for the optical film is usually a resin, and preferably a thermoplastic resin. As the resin, a substance containing various types of polymer as a main component can be used. Examples of the polymer may include an olefin polymer such as polyethylene and polypropylene, polyester polymer such as polyethylene terephthalate, polybutylene terephthalate, and polyethylene naphthalate, polyarylene sulfide polymer such as a polyphenylene sulfide, a polyvinyl alcohol polymer, a polycarbonate polymer, a polyarylate polymer, a cellulose ester polymer, a polyether sulfone polymer, a polysulfone polymer, a polyallyl sulfone polymer, a polyvinyl chloride polymer, a norbornene polymer, a rod-like liquid crystalline polymer, a polystyrene-based polymer including a homopolymer of styrene or a styrene derivative or a copolymer thereof with another monomer, a polyacrylonitrile polymer, a poly(methyl methacrylate) polymer, and a multicomponent copolymer thereof. Examples of the styrene derivative may include a styrene having a substituent substituted at a benzene ring or at an α-position thereof. Examples of the substituent may include an alkyl group such as a methyl group, a halogen atom such as chlorine, and an alkoxy group such as a methoxy group. Specific examples of the styrene derivative may include an alkylstyrene such as methylstyrene and 2,4-dimethylstyrene; a halogenated styrene such as chlorostyrene; a halogen-substituted alkylstyrene such as chloromethyl styrene; and an alkoxystyrene such as methoxystyrene. Among the styrene and the styrene derivatives, a styrene having no substituent is preferred.

As the polymer, one type thereof may be used alone, or two or more types thereof may be used in combination at any ratio.

The resin as the material for the optical film can contain particles. The particles may be formed from a polymer or a component other than a polymer. Examples of the particles formed from a polymer may include rubber particles such as acrylic rubber particles. The acrylic rubber particles are particles having rubber elasticity. The particles contain an alkyl acrylate ester such as butyl acrylate and 2-ethylhexyl acrylate as a main component and they are obtained by polymerization in the presence of a multifunctional monomer. The ratio of the particles in the total amount of the resin (when the optical film has layers of a plurality of types of resins, the resin forming a back surface) is preferably 5% by weight or more, and more preferably 10% by weight or more, and is preferably 50% by weight or less, and more preferably 40% by weight or less. The particle diameter of the particles is preferably 50 to 1,000 nm in terms of number average particle diameter. When the ratio and the particle diameter of the particles are adjusted to fall within the ranges, a desired three-dimensional center-line average roughness R1 can be imparted to the back surface of the optical film.

The resin as the material for the optical film may contain an optional component other than the aforementioned components as long as the effects of the present invention are not significantly impaired. Examples of the optional component may include a publicly known additive such as an antioxidant, a thermal stabilizer, a photostabilizer, an ultraviolet ray absorber, an antistatic agent, a dispersant, a chlorine scavenger agent, a flame retarder, a crystallization nucleating agent, a toughening agent, an anti-fogging agent, a release agent, a pigment, a neutralizer, a lubricant, a decomposer, a metal deactivator, an anti-fouling agent, and an antimicrobial agent. One type of the additive may be used alone, or two or more types thereof may be used in combination at any ratio. The amount of the optional component falls within a range not impairing the effects of the present invention, and is usually 50 parts by weight or less relative to 100 parts by weight of the polymer, and preferably 30 parts by weight or less, and the lower limit thereof is zero.

By appropriately selecting any of the materials exemplified above as the material for the optical film, an optical film having desired optical characteristics and desired tensile elastic modulus M1 at the same time can be obtained.

The optical film may be a single-layer film including only one layer, or a multilayer film including two or more layers. When the optical film includes two or more layers, each layer can be a layer formed from the aforementioned resin. When the optical film includes two or more layers, materials constituting the layers may be the same or different. In particular, suitable examples of the multilayer film may include a film including one or more 'a' layer formed from a resin containing a polystyrene-based polymer, and one or more 'b' layer formed from a resin containing a poly (methyl methacrylate) polymer. Preferable examples of the multilayer film containing the layer and the 'b' layer may include a multilayer film having a layer structure of 'b' layer/'a' layer/'b' layer, that is, a multilayer film containing the 'a' layer and a pair of the 'b' layers disposed in contact with the front surface and the back surface or the 'a' layer.

With reference to the example of FIG. 2, the optical film 120 that is a component of the multilayer film 100 includes a layer 122a as the 'a' layer, and layers 121b and 123b as the 'b' layers disposed in contact with a surface on a front side and a surface on a back side of the layer 122a. In this case, by adding the aforementioned particles as a material for the layer 123b at an adjusted rate, a desired back surface three-dimensional center-line average roughness R1 can be imparted to the back surface 120X of the optical film 120. Further, by appropriately adjusting the thicknesses of the layers 121b, 122a and 123b, optical characteristics desired for the optical film can be obtained. In particular, by taking advantage of a negative intrinsic birefringence value possessed by the polystyrene-based polymer, optical characteristics desired for the optical film such as a phase difference film can be obtained. By appropriately selecting materials for the layers 121b, 122a, and 123b, a desired tensile elastic modulus M1 can be obtained.

The thickness of the optical film is preferably 15 µm or more, and more preferably 20 µm or more, and is preferably 50 µm or less, and more preferably 45 µm or less. According to the present invention, even if the optical film is as thin as having a thickness equal to or less than the aforementioned upper limit, the multilayer film of the present invention can be stored as the wound body while occurrence of defects such as a gauge band and a winding wrinkle is suppressed and formation of the undesired concavo-convex shape is suppressed.

The thickness of the optical film can be measured by an online infrared thickness meter (trade name: RX-200 manufactured by KURABO INDUSTRIES LTD.). Specifically, the optical film is measured at least 10 times during conveyance in the width direction of the film at intervals in the width direction of 2 mm and a conveying rate of 10 m/min. From the average of all measurement results (i.e., all measurement results that are measured at 10 or more measurement points that are distributed in the width direction), the average thickness in the width direction of the film can be calculated as the thickness of the optical film.

The width and length of the optical film are not particularly limited and can be a width and a length that can be used in desired applications. Specifically, the width and length can be the same as the width and length of the multilayer film described above.

The optical film usually has high transparency. Specifically, the total light transmittance of the optical film is preferably 85% or more, and more preferably 90% or more. The upper limit thereof is ideally 100%. The total light transmittance herein can be measured in accordance with JIS K7361-1997.

The haze of the optical film is usually small, though it depends on applications. Specifically, the haze of the optical film is usually 10% or less, preferably 5% or less, and more preferably 1% or less. The lower limit thereof is ideally zero, but is usually 0.1% or more. The haze herein can be measured in accordance with JIS K7361-1997.

The optical film can be produced by any production method. Examples of the production method may include a melt molding method and a solution casting method. Specific examples of the melt molding method may include an extrusion molding method, a press molding method, an inflation molding method, an injection molding method, a blow molding method, and a stretching molding method. Among these methods, an extrusion molding method, an inflation molding method, and a press molding method are preferred since the optical film that has excellent mechanical strength and surface precision can be obtained. An extrusion molding method is particularly preferred since the optical film can be efficiently and simply produced while expression of phase difference is more surely suppressed.

When the optical film is produced as a multilayer film, any publicly known methods can be appropriately used, and the examples include a co-extrusion molding method such as a co-extrusion T-die method, a co-extrusion inflation method, and a co-extrusion lamination method; a film lamination molding method such as dry lamination; and a coating molding method of coating a layer with a resin solution constituting other layers. Among these, a co-extrusion molding method is preferred since production efficiency is good and a volatile component such as a solvent is prevented from remaining in the optical film. Among the co-extrusion molding methods, a co-extrusion T-die method is preferred. Examples of the co-extrusion T-die method may include a feed block method and a multi-manifold method. The multi-manifold method is further preferred since thicknesses fluctuation of layers can be reduced.

In the method for producing the optical film, a stretching step of stretching a film can be performed, if necessary.

[1.4. Protective Film]

The protective film is a long-length film that is bonded to the optical film for protection of the optical film and that constitutes the multilayer film. The protective film is usually bonded directly to a surface of the optical film with no other layer interposed therebetween.

As the protective film, a film releasable from the optical film is used. Specifically, the protective film is a film that can be bonded to the optical film to form the multilayer film, and can be released from the optical film upon using of the optical film.

As the protective film, a film in which the three-dimensional center-line average roughness R2 on the back surface side and the tensile elastic modulus M2 in the lengthwise direction satisfy the aforementioned formulae (2), (4), (5), and (6) is used. A protective film having such tensile elastic modulus M2 and back surface three-dimensional center-line average roughness R2 can be obtained, for example, by appropriately selecting a material for the protective film and appropriately adjusting a component of the material.

The optical film and the protective film are bonded so that a front surface of the optical film is in contact with a front surface of the protective film, thereby producing the multilayer film. The degree of releasing facility of the optical film and the protective film after the production of the multilayer film may be set to any level. The adhesive force between the optical film and the protective film is usually 20 mN/cm or more, and usually 800 mN/cm or less, and preferably 400 mN/cm or less. It is preferable that release of the protective film is easier. However, when the release is too easy, release may occur during winding and unrolling of the multilayer The adhesive force between the optical film and the protective film is influenced by the surface roughness of the optical film. As the surface roughness of the optical film is higher, usually the adhesive force can be decreased. By appropriately selecting a material for the surface of the protective film on the optical film side, the adhesive force to the optical film can fall within a desired range.

The thickness of the protective film can be appropriately set according to the thickness of the optical film in order to achieve protection of the optical film to a desired level. The thickness of the protective film is preferably 20 μm to 100 μm from the viewpoints of moldability and handling properties.

The width and length of the protective film are not particularly limited. The width and length thereof can be a width and a length that fit the width and length of the optical film to be protected and stored.

[1.5. Multilayer Protective Film]

The protective film may be a film having a single-layer structure including only one layer, although the protective film is usually a multilayer protective film including two or more layers. Suitable examples of the protective film may include a multilayer protective film including an adhesive layer, a back surface layer, and if necessary, an intermediate layer disposed between the adhesive layer and the back surface layer.

With reference to the example of FIG. 2, the protective film 110 as a component of the multilayer film 100 is a multilayer protective film including an adhesive layer 112 and a back surface, layer 111. A surface of the protective film 110 on a side of the adhesive layer 112 constitutes the surface 110Y on a side of the front surface of the protective film 110. In contrast, a surface of the protective film 110 on a side of the back surface layer constitutes the surface 110X on a side of the back surface of the protective film 110. Therefore, by appropriately selecting a material for the adhesive layer 112, a desired releasable adhesion can be imparted to the protective film 110. By appropriately selecting a material for the back surface layer 111, the tensile elastic modulus M2 and the back surface three-dimensional center-line average roughness R2 can be set to desired values.

[1.6. Multilayer Protective Film: Adhesive Layer]

The adhesive layer of the multilayer protective film can be formed by forming a layer of an adhesive on a surface of another layer such as the back surface layer.

Examples of the adhesive may include a rubber-based adhesive, an acrylic adhesive, a polyvinylether-based adhesive, a urethane-based adhesive, and a silicone-based adhesive. As the adhesive, one type thereof may be used alone, or two or more types thereof may be used in combination at any ratio.

Preferable examples of the adhesive may include a rubber-based adhesive containing a block copolymer represented by a general formula A-B-A or A-B (wherein A represents a styrenic polymer block and B represents a polymer block selected from the group consisting of a butadiene polymer block, an isoprene polymer block, and an olefin polymer block obtained by hydrogenation of these polymer blocks); and an acrylic adhesive.

In the block copolymer represented by the general formula A-B-A or A-B, it is preferable that the styrenic polymer block A has a weight average molecular weight of 12,000 to 100,000 and a glass transition temperature of 20° C. or higher. It is preferable that the polymer block B selected from the group consisting of a butadiene polymer block, an isoprene polymer block, and an olefin polymer block obtained by hydrogenation of these polymer blocks has a weight average molecular weight of 10,000 to 300,000 and a glass transition temperature of −20° C. or lower. The weight ratio A/B of the component A relative to the component B is preferably 5/95 to 50/50, and more preferably 10/90 to 30/70.

Examples of the block copolymer represented by the general formula A-B-A may include styrene-ethylene/propylene-styrene, styrene-ethylene/butylene-styrene, and hydrogenated products thereof. Examples of the block copolymer represented by the general formula A-B may include styrene-ethylene/propylene, styrene-ethylene/butylene, and hydrogenated products thereof.

Examples of the acrylic polymer contained in the acrylic, adhesive may include a homopolymer or a copolymer of an alkyl (meth) acrylate such as methyl (meth) acrylate, ethyl (meth) acrylate, n-butyl (meth) acrylate, 2-ethylhexyl (meth) acrylate, isobutyl (meth)acrylate, hexyl (meth) acrylate, octyl (meth) acrylate, lauryl (meth) acrylate, and stearyl (meth) acrylate; an alkoxyalkyl (meth)acrylate such as methoxyethyl (meth)acrylate and butoxyethyl (meth) acrylate; cyclohexyl (meth) acrylate, phenyl (meth) acrylate, benzyl (meth)acrylate, vinyl acetate, a (meth) acrylamide such as (meth)acrylamide and N-methylol (meth)acrylamide, styrene, acrylonitrile, vinvlpyridine, vinylpyrrolidone, and a vinyl alkyl ether. In this application, "(meth) acrylate" means acrylate, methacrylate, or a combination thereof, and (meth) acrylic means acrylic, methacrylic, or a combination thereof.

Preferable examples of the acrylic polymer may include a copolymer of a monomer composition containing a monomer including those exemplified above and an acrylic monomer having a functional group. Examples of the acrylic monomer having a functional group may include an unsaturated acid such as maleic acid, fumaric acid, and (meth) acrylic acid; 2-hydroxyethyl (meth)acrylate, 2-hydroxypropyl (meth)acrylate, 2-hydroxyhexyl (meth) acrylate, dimethylaminoethyl methacrylate, (meth)acrylamide, N-methylol (meth) acrylamide, glycidyl (meth)acrylate, and maleic anhydride. As the acrylic monomer having a functional group, one type thereof may be used alone, or two or more types thereof may be used in combination at any ratio.

The acrylic adhesive can contain a cross-linking agent, if necessary. The cross-linking agent is a compound to be subjected to a thermal cross-linking reaction with a functional group possessed by the copolymer thereby finally forming a three-dimensional net structure. When the acrylic adhesive contains such a cross-linking agent, adhesion between the adhesive layer and another layer (intermediate layer, back surface layer, etc.) in the protective film, toughness, solvent resistance, and water resistance and the like of the protective film can be improved. Examples of the cross-linking agent may include an isocyanate-based compound, a melamine-based compound, a urea-based compound, an epoxy-based compound, an amino-based compound, an amide-based compound, an aziridine compound, an oxazoline compound, a silane-coupling agent, and modified products thereof. As the cross-linking agent, one type thereof may be used alone, or two or more types thereof may be used in combination at any ratio.

It is preferable that an isocyanate-based compound and a modified product thereof are used as the cross-linking agent from the viewpoints of crosslinking property and toughness and the like of the adhesive layer. The isocyanate-based compound is a compound having two or more isocyanate groups in one molecule and is broadly classified into an aromatic compound and an aliphatic compound. Examples of the aromatic isocyanate compound may include tolylene diisocyanate, diphenylmethane diisocyanate, polymethylenepolyphenyl polyisocyanate, naphthalene diisocyanate, tolidine diisocyanate, and p-phenylene diisocyanate. Examples of the aliphatic isocyanate compound may include hexamethylene diisocyanate, isophorone diisocyanate, dicyclohexylmethane diisocyanate, hydrogenated xylylene diisocyanate, lysine diisocyanate, tetramethylxylene diisocyanate, and xylylene diisocyanate. Examples of modified products of the isocyanate-based compounds may include biuret products, isocyanurate products, and trimethylolpropane adduct products of the isocyanate-based compounds.

When the adhesive contains the cross-linking agent, the adhesive may further contain a cross-linking catalyst such as dibutyl tin laurate to promote the cross-linking reaction.

The adhesive can contain an adhesion-imparting polymer, if necessary. Examples of the adhesion-imparting polymer may include an aromatic hydrocarbon polymer, an aliphatic hydrocarbon polymer, a terpene polymer, a terpenephenol polymer, an aromatic hydrocarbon-modified terpene polymer, a coumarone-indene polymer, a styrene-based polymer, a rosin-based polymer, a phenol-based polymer, and a xylene polymer. Among these, an aliphatic hydrocarbon polymer such as low density polyethylene is preferred. A specific type of the adhesion-imparting polymer is appropriately selected in terms of compatibility with the aforementioned block copolymer, the melting point of the resin, and the adhesive force of the adhesive layer. As the adhesion-imparting polymer, one type thereof may be used alone, or two or more types thereof may be used in combination at any ratio.

The amount of the adhesion-imparting polymer is preferably 5 parts by weight or more, for example, relative to 100 parts by weight of the aforementioned block copolymer, and is preferably 200 parts by weight or less, and more preferably 100 parts by weight or less. When the amount of the adhesion-imparting polymer is too small, lifting and separation of the protective film may occur in bonding to the optical film. When the amount is too large, the feeding tension is increased, a wrinkle and damage may occur during bonding to the optical film, and bleed-out of the adhesion-imparting polymer may occur to easily reduce the adhesive force.

The adhesive may contain an additive such as a softener, an age resistor, a filler, and a colorant (a dye, a pigment, etc.), if necessary. As the additive, one type thereof may be used alone, or two or more types thereof may be used in combination at any ratio.

Examples of the softener may include process oil, liquid rubber, and a plasticizer.

Examples of the filler may include barium sulfate, talc, calcium carbonate, mica, silica, and titanium oxide.

The adhesive force of the adhesive layer to the other layer (intermediate layer, back surface layer, etc.) in the protective film is preferably 2 mN/cm or more, more preferably 4 mN/cm or more, and is preferably 200 mN/cm or less, and more preferably 160 mN/cm or less. When the adhesive force is too low, lifting and separation of the protective film may occur in bonding to the optical film. When the adhesive force is too high, the feeding tension is increased, and a wrinkle and damage may easily occur during bonding to the optical film.

The thickness of the adhesive layer is usually 1.0 µm or more, and preferably 2.0 µm or more, and is usually 50 µm or less, and preferably 30 µm or less. When the adhesive layer is too thin, the adhesive force is decreased, and lifting and separation of the protective film may occur. When the adhesive layer is too thick, the adhesive force is excessively increased, and the feeding tension is increased. As a result, a wrinkle and damage may easily occur during bonding to the optical film. Furthermore, the stiffness of the protective film can be increased to deteriorate the handleability.

[1.7. Multilayer Protective Film: Back Surface Layer]

The back surface layer of the multilayer protective film is a layer that is disposed at a back surface of the protective film and does not adhere to the optical film. The back surface layer can be usually a layer formed from a resin containing a polymer. The polymer contained in the resin forming the back surface layer may be a homopolymer or a copolymer. Suitable examples of the polymer may include a polyester-based polymer and a polyolefin-based polymer.

Examples of the polyester-based polymer may include polyethylene terephthalate and polyethylene naphthalate.

Examples of the polyolefin-based polymer may include polyethylene, polypropylene, an ethylene-propylene copolymer, a propylene-α-olefin copolymer, an ethylene-α-olefin copolymer, an ethylene-ethyl (meth)acrylate copolymer, an ethylene-methyl (meth) acrylate copolymer, an ethylene-n-butyl (meth) acrylate copolymer, and an ethylene-vinyl acetate copolymer. Examples of polyethylene may include low density polyethylene, medium density polyethylene, high density polyethylene, and linear low density polyethylene. Examples of the ethylene-propylene copolymer may include a random copolymer and a block copolymer. Examples of α-olefin may include butene-1, hexene-1, 4-methylpentene-1, octene-1, pentene-1, and heptene-1.

Among the polyolefin-based polymers, polyethylene terephthalate and polypropylene are particularly preferred since a value such as desired M2 can be easily obtained.

The resin forming the back surface layer can contain particles. The particles may be formed from a polymer or a component other than the polymer. Examples of the particles for a back surface layer may include inorganic particles such as calcium carbonate particles and silica particles. The ratio of the particles in the total amount of the resin forming the back surface layer is preferably 0.05% by weight or more, and more preferably 0.1% by weight or more, and is preferably 1.0% by weight or less, and more preferably 0.8% by weight or less. The particle diameter of the particles is preferably 0.01 to 10 μm in terms of number average particle diameter. By adjusting the ratio and the particle diameter of the particles to fall within the ranges, a desired three-dimensional center-line average roughness R2 can be imparted to the back surface of the protective film.

The resin forming the back surface layer may contain an optional component other than the aforementioned components as long as the effects of the present invention are not significantly impaired. Examples of the optional component may include an additive such as a filler like talc, stearylamide, and calcium stearate, a lubricant, an antioxidant, an ultraviolet ray absorber, a pigment, an antistatic agent, and a nucleating agent. As the optional component, one type thereof may be used alone, or two or more types thereof may be used in combination at any ratio.

The back surface layer has a thickness that satisfies a ratio of a thickness of the adhesive layer relative to that of the back surface layer (adhesive layer/back surface layer) of usually 1/40 or more, preferably 1/20 or more, and of usually 1/1 or less, and preferably 1/2 or less. When the thickness of the back surface layer is too thin relative to the adhesive layer, the film-forming property may be deteriorated to generate many fish eyes. When it is too thick, the feeding tension is increased, and a wrinkle and damage may easily occur during bonding of the protective film to the optical film.

[1.8. Multilayer Protective Film: Intermediate Layer]

If necessary, the intermediate layer may be disposed between the adhesive layer and the back surface layer. The intermediate layer is usually formed from a resin. In particular, it is preferable that the intermediate layer is formed from a resin containing a polyolefin-based polymer.

Examples of the polyolefin-based polymer contained in the intermediate layer may include low density polyethylene, medium density polyethylene, high density polyethylene, linear low density polyethylene, an ethylene-α-olefin copolymer, polypropylene, an ethylene-propylene copolymer (random copolymer and/or block copolymer), an α-olefin-propylene copolymer, an ethylene-ethyl (meth) acrylate copolymer, an ethylene-methyl (meth) acrylate copolymer, an ethylene-n-butyl (meth) acrylate copolymer, and an ethylene-vinyl acetate copolymer. As the polyolefin-based polymer, one type thereof may be used alone, or two or more types thereof may be used in combination at any ratio. It is preferable that the polyolefin-based polymer contained in the intermediate layer is a polyolefin-based polymer that is different from the polymers contained in the adhesive layer and the back surface layer.

The intermediate layer can contain the material forming the adhesive layer and the material forming the back surface layer, if necessary. When the protective film is produced by a co-extrusion molding method, an end portion where the thickness thereof is not uniform is usually slit and removed in a slitting step or the like. By using the thus removed portion as a raw material for the intermediate layer, the amount of raw material to be used can be decreased.

For example, the intermediate layer can contain an additive such as a filler including talc, stearamide, and calcium stearate, a lubricant, an antioxidant, an ultraviolet ray absorber, a pigment, an antistatic agent, and a nucleating agent as long as the effects of the present invention are not significantly impaired. As the additive, one type thereof may be used alone, or two or more types thereof may be used in combination at any ratio.

The thickness of the intermediate layer is usually 13 μm to 70 μm.

[1.9. Method for Producing Protective Film]

The method for producing the protective film is not limited, and any method can be used. Examples of the method for producing the protective film may include the following methods (i) to (iii).

(i) A method in which the material for the adhesive layer and the material for the back surface layer, and if necessary, the material for the intermediate, layer are co-extruded.

(ii) A method in which a film of the back surface layer (or a film in which the back surface layer and the intermediate layer are layered) is prepared and the adhesive is applied onto a surface of the film to form the adhesive layer.

(iii) A method in which the adhesive layer and the back surface layer, and if necessary, the intermediate layer are separately prepared and integrated by bonding.

Among the methods (i) to (iii), the method (i) is preferred since strong adhesion between the adhesive layer and the back surface layer or the intermediate layer can be achieved, remaining of the adhesive on the optical film is unlikely to occur, and the cost is low due to simplification of production process. "Remaining of the adhesive" herein refers to a phenomenon that the adhesive remains on the optical film after release of the protective film.

On the other hand, the method (iii) is preferred since a layer having uniform thickness such as the adhesive layer and the back surface layer can be simply obtained. More specifically, the method (iii) can be performed by applying the adhesive as the material for the adhesive layer or an optional film such as a release film to form the adhesive layer, and transferring the adhesive layer to a surface of the back surface layer or the intermediate layer. Specifically, a multilayer film having a layer structure of release film/adhesive layer is produced, and bonded to the back surface layer (or multilayer film having a layer structure of intermediate layer/back surface layer), to prepare the protective film having a layer structure of release film/adhesive layer/back surface layer (or release film/adhesive layer/intermediate layer/back surface layer). Immediately before bonding of the protective film to the optical film, the release film can be released therefrom to use the protective film (as to the protective film in this application, the multilayer film containing the release film and the multilayer film after release of the release film may be referred to as "protective film" without distinction when it is evident from the context).

In production of the protective film, an operation of deforming the surface of the back surface layer can be performed, if necessary. Thus, the three-dimensional centerline average roughness R2 of the protective film on the back surface side can be adjusted to fall within a desired range. Examples of the operation of deforming the surface of the back surface layer may include a method of pressing the surface by a shaping roll having a concavo-convex structure; a method of layering a release film having a concavo-convex structure on the surface and pressurizing the release film to transfer the concavo-convex structure of the release film; and a method or spraying fine particles to the back surface of the protective film to cut the back surface of the protective film. A process of deforming the surface of the back surface layer may be performed before or after bonding of the back surface layer to the adhesive layer.

The back surface of the protective film may be subjected to a surface modifying treatment, if necessary. Examples of the surface modifying treatment may include irradiation with an energy ray and a chemical treatment.

On the back surface of the protective film, printing may be performed, if necessary.

[1.10. Production of Multilayer Film: Bonding]

Usually, the multilayer film of the present invention can be produced by separately producing the optical film and the protective film by any methods such as the aforementioned methods and bonding the films. In order to eliminate wrinkles and slacking of the optical film and the protective film in bonding, the bonding operation is usually performed while a predetermined tension is applied to the optical film and the protective film. Specifically, the bonding can be performed by layering the optical film and the protective film with the lengthwise directions thereof aligned so as to bring the surface of the optical film on the front surface side into contact with the surface of the protective film on the front surface side, and pressurizing them from the back surface of the optical film and the back surface of the protective film. The pressurization can be continuously performed using a roll such as a nip roll.

[2. Wound Body]

The wound body of the present invention is formed by winding the long-length multilayer film described above into a roll shape. When the long-length multilayer film is wound into a roll shape, it is preferable that the surface of the multilayer film on the side of the optical film is positioned inside and the surface thereof on the side of the protective film is positioned outside. In the wound body of the present invention, one surface of the multilayer film is in contact with another surface of the multilayer film that is wound on the surface. Specifically, in the wound body of the present invention, the back surface of the protective film, is in contact with the back surface of the optical film. When the back surface three-dimensional center-line average roughness R1 of the optical film, the back surface three-dimensional center-line average roughness R2 of the protective film, the tensile elastic modulus M1 in the lengthwise direction of the optical film, and the tensile elastic modulus M2 in the lengthwise direction of the protective film satisfy the relationships of the aforementioned formulae (1) to (6), occurrence of defects such as a gauge band and a winding wrinkle is suppressed and formation of the undesired concavo-convex shape on the surface of the optical film is suppressed in the wound body.

The winding number of the wound body is not limited, and is usually 40 or more, and preferably 60 or more, and is usually 27,000 or less, and preferably 13,000 or less.

The outside diameter of the wound body is not limited, and is usually 160 mm or more and preferably 190 mm or more, and is usually 2,300 mm or less, and preferably 1,200 mm or less.

The wound body of the present invention is produced by winding the multilayer film into a roll shape. An appropriate winding core is used if necessary in winding. The wound body can be produced by winding the multilayer film around the winding core.

The winding rate of the multilayer film 10 is usually 5 m/min or more, and preferably 10 m/min or more, and is usually 50 m/min or less, preferably 45 m/min or less, and more preferably 40 m/min or less. When the winding, rate is equal to or more than the lower limit of the range, the production efficiency can be enhanced. When it is equal to or less than the upper limit, the amount of air to be involved can be reduced.

EXAMPLES

Hereinafter, the present invention will be specifically described by showing Examples. However, the present invention is not limited to the following Examples. The present invention may be optionally modified without departing from the scope of claims of the present invention and equivalents thereto.

Unless otherwise specified, "%" and "part" that represent an amount in the following description are based on weight.

[Evaluation Method]

(1) Method for Measuring Thickness of Film

The film thickness of an optical film was calculated from an average of all measurement results (i.e., all measurement results that were measured at 10 measurement points or more in the width direction of the film) that were obtained by measuring the optical film during conveyance at least 10 times in a width direction of the film by an online infrared thickness meter (trade name: RX-200 manufactured by KURABO INDUSTRIES LTD.) at intervals in the width direction of 2 mm and a conveying rate of 10 m/min.

(2) Method for Measuring Tensile Elastic Modulus of Film

The tensile elastic modulus (M1 and M2) of a film was measured by a tensile tester (Model 5564 digital material testing system manufactured by Instron Corporation) in accordance with JIS K 7113. As measurement conditions, the tensile rate was 5 m/min, the number of test was 5, the room temperature was 23° C., and the humidity was 50% RH.

From the film, a sample piece was cut out. The sample piece had a rectangular shape (10 mm in width and 250 mm in length of long sides) with long sides parallel to the lengthwise direction of the film. The stress at which the sample piece was drawn in the long side direction and deformed was measured. The measurement was performed by a tensile tester provided with a chamber with constant temperature and humidity (Model 5564 digital material testing system manufactured by Instron Japan Co., Ltd.) in accordance with JIS K 7113. As the measurement conditions, the temperature was 23° C., the humidity was 60±5% RH, the distance between chucks was 115 mm, and the tensile rate was 100 mm/min. The measurement was performed 3 times. From the measurement data of the measured stress and distortion corresponding to the stress, four sets of measurement data in which the distortion of the sample piece was within a range of 0.6% to 1.2% for every 0.2% (i.e., measurement data at which the distortion was 0.6%, 0.8%, 1.0%, and 1.2%) were selected. From the four sets of measurement data during three measurements (total: 12 sets), the tensile elastic modulus of the film was calculated using a least-square method.

(3) Method for Measuring Three-Dimensional Center-Line Average Roughness

The three-dimensional center-line average roughness Ra (R1 and R2) of back surface of an optical film and a protective film was measured by a surface roughness meter (product name "SJ400" manufactured by Mitutoyo Corporation) in accordance with JIS B 0601:1994.

(4) Evaluation of Outer Appearance

The outer appearance of a wound body after winding was examined by visual observation and touching, whereby the presence or absence of defect such as a winding wrinkle and a gauge band was evaluated. When the defect was not found, the wound body was evaluated as "good". When the defect was found, what defect was found was recorded.

(5) Evaluation of Concavo-Convex Shape

From a wound body of a multilayer film, the multilayer film was unrolled, the protective film was released, and the optical film was irradiated with light of a fluorescent lamp. The reflective light was observed to inspect presence or absence of a concavo-convex shape on a surface of the optical film. The observation range covered the overall width×1 m. When a concavo-convex shape was not observed, the film was evaluated as having no transfer of the concavo-convex shape. When one or more concavo-convex shapes were observed, the film was evaluated as having transfer.

Preparative Example 1

An esterification reaction vessel heated to 200° C. was charged with 86.4 parts of terephthalic acid and 64.6 parts of ethylene glycol, and supplied with, as catalysts, 0.017 parts of antimony trioxide, 0.064 parts of magnesium acetate tetrahydrate, and 0.16 parts of triethylamine with stirring. Subsequently, pressure and temperature were increased to perform an esterification reaction under pressure under conditions of a gauge pressure of 0.34 MPa and 240° C. After that, the esterification reaction vessel was reduced to normal pressure, and 0.014 parts of trimethyl phosphate was added. The temperature was increased over 15 minutes to 260° C., and 0.012 parts of trimethyl phosphate was added. After 15 minutes, a dispersion treatment was performed by a high-pressure disperser. 0.03 parts in terms of particle content of an ethylene glycol slurry of silica particles having a number average particle diameter of 2.50 µm was added. The silica particles were particles obtained by previously preparing an ethylene glycol slurry of silica containing 0.1 parts in terms of sodium atom of a sodium tripolyphosphate aqueous solution relative to 100 parts of silica particles, and removing coarse particulate parts from the slurry by 35% through centrifugation, followed by filtration through a metal filter with an opening of 5 µm. After 15 minutes, the obtained esterification reaction product was sent to a polycondensation reaction tank, and a polycondensation reaction was performed under reduced pressure at 280° C. to obtain a polyethylene terephthalate resin.

Example 1

(1-1. Back Surface Layer Film)

To the polyethylene terephthalate resin obtained in Preparative Example 1, 0.05% by weight of silica particles having a number average particle diameter of 5.0 µm was added, to prepare a film raw material. The film raw material was supplied to an extruder for melting, extruded from a sleeve, and cast on a cooling drum, to form an unstretched film. The resulting unstretched film was stretched 3.5 times in an MD direction (film lengthwise direction) at a stretching temperature of 120° C. by a roll stretching device, and then 3.6 times in a TD direction (film width direction) by a tenter stretching device for achieving successive biaxial stretching, to obtain a back surface layer film 1 having a thickness of 30 µm.

(1-2 Adhesive Layer)

To 100 parts by weight of a copolymer obtained by copolymerization of 97 parts by weight of n-butyl acrylate and 3 parts by weight of 2-hydroxyethyl acrylate, 1 part by weight of polyisocyanate as a crosslinking agent was added, and 200 parts by weight of toluene as a solvent was further added, to prepare an adhesive composition.

Onto a release treatment surface of a release film (trade name "SP-PET", available from Mitsui Chemicals Tohcello, Inc.) having a thickness of 38 µm, the adhesive composition obtained by the aforementioned procedure was applied by a knife-type coater so that the dried thickness was 20 µm. The layer of the adhesive composition was heated and dried at 90° C. for one minute to form an adhesive layer. Thus, a multilayer product having a layer structure of (release film)/(adhesive layer) was obtained.

(1-3. Protective Film)

To one surface of the back surface layer film obtained in (1-1), the multilayer product obtained in (1-2) was bonded so that a surface of the multilayer product on a side of the adhesive layer was in contact with the back surface layer film, to thereby produce a protective film (with the release film) having a layer structure of (release film)/(adhesive layer)/(back surface layer film).

For the obtained protective film, the three-dimensional center-line average roughness R2 of a surface on a side of the back surface layer film was measured. The release film was released from the obtained protective film, and the tensile elastic modulus M2 in the lengthwise direction was measured.

(1-4. Optical Film)

As a resin A, a styrene-maleic anhydride copolymer resin (Dylark 0332 available from Nova Chemicals Japan Ltd.) that is a resin having a negative intrinsic birefringence value was prepared.

As a resin B, a methacrylic resin composition (SUMIPEX HT50Y: available from Sumitomo Chemical Co., Ltd.) containing rubber particles was prepared.

The resins A and B were supplied to a film formation device for three-type three-layer co-extrusion molding (a device of type with which three types of resins were used to form a film consisting of three layers), and simultaneously extruded from a multi-manifold die into a film shape. The melted resin thus co-extruded into a film shape was cast on a cooling roll having a mirror surface (Ra of the surface=0.01 µm), and then passed through two cooling rolls, to obtain an unstretched layered body 'c' having an 'a' layer formed from the resin A and a 'b' layer formed from the resin B in an order of 'b' layer 'a' layer/'b' layer. The conditions of co-extrusion were controlled to set the thicknesses of 'b' layer/'a' layer/'b' layer to 33 µm/16 µm/33 µm.

The resulting unstretched layered body 'c' was subjected to simultaneous biaxial stretching at a stretching ratio of 1.8 in an MD direction and at a stretched ratio of 1.3 in a TD direction at a stretching temperature of 135° C. to obtain an optical film 1 having a thickness of 35 µm.

For the obtained optical film 1, the three-dimensional center-line average roughness R1 of a back surface was measured. The tensile elastic modulus M1 in the lengthwise direction of the obtained optical film was measured.

(1-5. Multilayer Film and Wound Body)

From the protective film (with the release film) obtained in (1-3), the release film was released. The surface of the film on the adhesive layer side was bonded to one surface of the optical film obtained in (1-4), to obtain a multilayer film having the protective film and the optical film. In bonding, the feeding tension of the protective film was set to 250 N, and the tension of the optical film during conveying was set to 150 N. The bonding was performed so that the lengthwise directions of the protective film and the optical film were aligned. The obtained multilayer film as it was was wound, to form a wound body. The multilayer film in the obtained wound body had a length of 2,000 m and a width of 1,490 mm. The winding number of the wound body as 2,089. The winding tension during winding of the multilayer film was set to 120 N to 140 N, and the winding rate was set to 10 m/min.

The outer appearance of the obtained wound body and a concavo-convex shape of the multilayer film in the wound body were evaluated.

Example 2

(2-1. Back Surface Layer Film)

A back surface layer film 2 was obtained by performing the same operation as in (1-1) of Example 1 except for the following changes.

A polypropylene resin (F113G: available from Prime Polymer Co., Ltd.) was used in place of the polyethylene terephthalate resin.

Silica particles having a number average particle diameter of 1.5 μm were used in place of silica particles having a number average particle diameter of 5.0 μm.

The resulting unstretched film was stretched 5 times in an MD direction at a stretching temperature of 160° C. by a roll stretching device and then 10 times in a TD direction by a tenter stretching device for achieving successive biaxial stretching, to obtain a back surface layer film 2 having a thickness of 30 μm.

(2-2. Optical Film)

An optical film 2 was obtained by performing the same operation as in (1-4) of Example 1 except for the following changes, and R1 and M1 were measured.

In place of the methacrylic resin composition (SUMIPEX HT50Y: available from Sumitomo Chemical Co., Ltd.) containing rubber particles, another methacrylic resin composition (SUMIPEX HT55X: available from Sumitomo Chemical Co., Ltd.) containing rubber particles was used.

(2-3. Multilayer Film, Wound Body, Etc.)

A protective film, a multi layer film, and a wound body of the multilayer film were obtained by performing the same operations as in (1-2), (1-3), and (1-5) of Example 1 except that the back surface layer film 2 obtained in (2-1) was used in place of the back surface layer film 1, and the optical film 2 obtained in (2-2) was used in place of the optical film 1. Then, measurement and evaluation were performed in the same manner.

Example 3

(3-1. Back Surface Layer Film)

A back surface layer film 3 was obtained by performing the same operation as in (1-1) of Example 1 except for the following changes.

Silica particles having a number average particle diameter of 1.5 μm were used in place of silica particles having a number average particle diameter of 5.0 μm.

The stretching ratio of successive biaxial stretching was 3.7 times in an MD direction and 3.8 times in a TD direction.

(3-2. Multilayer Film, Wound Body, Etc.)

A protective film, an optical film a multilayer film, and a wound body of the multilayer film were obtained by performing the same operations as in (1-2) to (1-5) of Example 1 except that the back surface layer film 3 obtained in (3-1) was used in place of the back surface layer film 1. Then, measurement and evaluation were performed in the same manner.

Example 4

(4-1. Back Surface Layer Film)

A back surface layer film 4 was obtained by performing the same operation as in (2-1) of Example 2 except for the following changes.

Silica particles having a number average particle diameter of 10.0 μm were used in place of silica particles having, a number average particle diameter of 5.0 μm.

(4-2. Multilayer Film, Wound Body, Etc.)

A protective film, a multilayer film, and a wound body of the multilayer film were obtained by performing the same operations as in (1-2), (1-3), and (1-5) of Example 1 except that the back surface layer film 4 obtained in (4-1) was used in place of the back surface layer film 1, and the optical film 2 obtained in Example 2 was used in place of the optical film 1. Then, measurement and evaluation were performed in the same manner.

Example 5

(5-1. Back Surface Layer Film)

A back surface layer film 5 was obtained by performing the same operation as in (1-1) of Example 1 except for the following changes.

Silica particles having a number average particle diameter of 10.0 μm were used in place of silica particles having a number average particle diameter of 5.0 μm.

(5-2. Multilayer Film, Wound Body, Etc.)

A protective film, an optical film, a multilayer film, and a wound body of the multilayer film were obtained by performing the same operations as in (1-2) to (1-5) of Example 1 except that the back surface layer film 5 obtained in (5-1) was used in place of the back surface layer film 1. Then, measurement and evaluation were performed in the same manner.

Example 6

(6-1. Back Surface Layer Film)

A back surface layer film 12 was obtained by performing the same operation, as in (1-1) of Example 1 except for the following changes.

Silica particles having a number average particle diameter of 16.0 μm were used in place of silica particles having a number average particle diameter of 5.0 μm.

(6-2. Optical Film)

An optical film 5 was obtained by performing the same operation as in (1-4) of Example 1 except for the following changes, and R1 and M1 were measured.

As the cooling roll for casting of the melted resin co-extruded in a film shape, a cooling roll having a concavo-convex shape on a surface (Ra of the surface=0.3 μm) was used in place of the cooling roll having a mirror surface.

(6-3. Multilayer Film, Wound Body, Etc.)

A protective film, a multilayer film, and a wound body of the multilayer film were obtained by performing the same operations as in (1-2), (1-3), and (1-5) of Example 1 except that the back surface layer film 12 obtained in (6-1) was used in place of the back surface layer film 1, and the optical film 5 obtained in (6-2) was used in place of the optical film 1. Then, measurement and evaluation were performed in the same manner.

Comparative Example 1

(C1-1. Optical Film)

An optical film 3 was obtained by performing the same operation as in (2-2) of Example 2 except for the following changes, and R1 and M1 were measured.

As the cooling, roll for casting of the melted resin co-extruded in a film shape, a cooling roll having a concavo-convex shape on a surface (Ra of the surface=0.3 μm) was used in place of the cooling roll having a mirror surface.

(C1-2. Multilayer Film, Wound Body, Etc.)

A protective film, a multilayer film, and a wound body of the multilayer film were obtained by performing the same operations as in (1-2), (1-3), and (1-5) of Example 1 except that the back surface layer film 2 obtained in Example 2 was used in place of the back surface layer film 1, and the optical film 3 obtained in (C1-1) was used in place of the optical film 1. Then, measurement and evaluation were performed in the same manner.

Comparative Example 2

(C2-1. Back Surface Layer Film)

A back surface layer film 6 was obtained by performing the same operation as in (2-1) of Example 2 except for the following changes.

The stretching ratio of successive biaxial stretching was 3 times in an MD direction and 4 times in a TD direction.

(C2-2. Multilayer Film, Wound Body, Etc.)

A protective film, a multilayer film, and a wound body of the multilayer film were obtained by performing the same operations as in (1-2), (1-3), and (1-5) of Example 1 except that the back surface layer film 6 obtained in (C2-1) was used in place of the back surface layer film 1, and the optical film 2 obtained in Example 2 was used in place of the optical film 1. Then, measurement and evaluation were performed in the same manner.

Comparative Example 3

(C3-1. Back Surface Layer Film)

A back surface layer film 7 was obtained by performing the same operation as in (2-1) or Example 2 except for the following changes.

Silica particles having a number average particle diameter of 16.0 μm were used in place of silica particles having a number average particle diameter of 1.5 μm.

(C3-2. Multilayer Film, Wound Body, Etc.)

A protective film, a multilayer film, and a wound body of the multilayer film were obtained by performing the same operations as in (1-2), (1-3), and (1-5) of Example 1 except that the back surface layer film 7 obtained in (C3-1) was used in place of the back surface layer film 1, and the optical film 2 obtained in Example 2 was used in place of the optical film 1. Then, measurement and evaluation were performed in the same manner.

Comparative Example 4

(C4-1. Back Surface Layer Film)

A back surface layer film 8 was obtained by performing the same operation as in (C2-1) of Comparative Example 2 except for the following changes.

Silica particles having a number average particle diameter of 10.0 μm were used in place of silica particles having a number average particle diameter of 1.5 μm.

(C4-2. Multilayer Film, Wound Body, Etc.)

A protective film, a multilayer film, and a wound body of the multilayer film were obtained by performing the same operations as in (1-2), (1-3), and (1-5) of Example 1 except that the back surface layer film 8 obtained in (C4-1) was used in place of the back surface layer film 1, and the optical film 2 obtained in Example 2 was used in place of the optical film 1. Then, measurement and evaluation were performed in the same manner.

Comparative Example 5

(C5-1. Back Surface Layer Film)

A back surface layer film 9 was obtained by performing the same operation as in (3-1) of Example 3 except for the following changes.

The stretching ratio of successive biaxial stretching was 4.5 times in an MD direction and 4.2 times in a TD direction.

(C5-2. Multilayer Film, Wound Body, Etc.)

A protective film, an optical film, a multilayer and a wound body of the multilayer film were obtained by performing the same operations as in (1-2) to (1-5) of Example 1 except that the back surface layer film 9 obtained in (C5-1) was used in place of the back surface layer film 1. Then, measurement and evaluation were performed in the same manner.

Comparative Example 6

(C6-1. Back Surface Layer Film)

A back surface layer film 10 was obtained by performing the same operation as in (5-1) of Example 5 except for the following changes.

Silica particles having a number average particle diameter of 1.5 μm were used in place of silica particles having a number average particle diameter of 10.0 μm.

(C6-2. Optical Film)

An optical film 4 was obtained by performing the same operation as in (1-4) of Example 1 except for the following changes, and R1 and M1 were measured.

As the cooling roll for casting of the melted resin co-extruded in a film shape, a cooling roll having a concavo-convex shape on a surface (Ra of the surface=0.3 μm) was used in place of the cooling roll having a mirror surface.

(C6-3. Multilayer Film, Wound Body, Etc.)

A protective film, a multilayer film, and a wound body of the multilayer film were obtained by performing the same operations as in (1-2), (1-3), and (1-5) of Example 1 except that the back surface layer film 10 obtained in (C6-1) was used in place of the back surface layer film 1, and the optical film 4 obtained in (C6-2) was used in place of the optical film 1. Then, measurement and evaluation were performed in the same manner.

Comparative Example 7

(C7-1. Back Surface Layer Film)

A back surface layer film 11 was obtained by performing the same operation as in (C5-1) of Comparative Example 5 except for the following changes.

Silica particles having a number average particle diameter of 16.0 μm were used in place of silica particles having a number average particle diameter of 1.5 μm.

(C7-2. Multilayer Film, Wound Body, Etc.)

A protective film, an optical film, a multilayer film, and a wound body of the multilayer film were obtained by performing the same operations as in (1-2) to (1-5) of Example 1 except that the back surface layer film 11 obtained in (C7-1) was used in place of the back surface layer film 1. Then, measurement and evaluation were performed in the same manner.

Comparative Example 8

(C8-1. Optical Film)

An optical film 6 was obtained by performing the same operation as in (1-4) of Example 1 except for the following changes, and R1 and M1 were measured.

As the cooling roll for casting of the melted resin co-extruded in a film shape, a cooling roll having a mirror surface with higher flatness (Ra of the surface=0.005 μm) was used in place of the cooling roll having a mirror surface with 0.01 μm of surface Ra.

(C8-2. Multilayer Film, Wound Body, Etc.)

A protective film, an optical film, a multilayer film, and a wound body of the multilayer film were obtained by performing the same operations as in (1-2), (1-3), and (1-5) of Example 1 except that the optical film 6 obtained in (C8-1) was used in place of the optical film 1, and the back surface layer film 3 obtained in (3-1) of Example 3 was used in place of the back surface layer film 1. Then, measurement and evaluation were performed in the same manner.

Comparative Example 9

(C9-1. Optical Film)

An optical film 7 was obtained by performing the same operation as in (1-4) of Example 1 except for the following changes, and R1 and M1 were measured.

As the cooling roll for casting of the melted resin co-extruded in a film shape, a cooling roll having a concavo-convex shape on a surface (Ra of the surface=0.5 μm) was used in place of the cooling roll having a mirror surface.

(C9-2. Back Surface Layer Film)

A back surface layer film 13 was obtained by performing the same operation as in (1-1) of Example 1 except for the following changes.

Silica particles having a number average particle diameter of 30.0 μm were used in place of silica particles having a number average particle diameter of 5.0 μm.

(C9-3. Multilayer Film, Wound Body, Etc.)

A protective film, an optical film, a multilayer film, and a wound body of the multilayer film were obtained by performing, the same operations as in (1-2), (1-3), and (1-5) of Example 1 except that the optical film 7 obtained in (C9-1) was used in place of the optical film 1, and the back surface layer film 13 obtained in (C9-2) was used in place of the back surface layer film 1. Then, measurement and evaluation were performed in the same manner.

The measurement and evaluation results of Examples and Comparative Examples are shown in Tables 1 and 2.

TABLE 1

| | R1 (μm) | R2 (μm) | M1 (MPa) | M2 (MPa) | R2/R1 | M2/M1 |
|---|---|---|---|---|---|---|
| Example 1 | 0.02 | 0.06 | 2200 | 5000 | 3.0 | 2.3 |
| Example 2 | 0.02 | 0.02 | 2500 | 2500 | 1.0 | 1.0 |
| Example 3 | 0.02 | 0.02 | 2200 | 5500 | 1.0 | 2.5 |
| Example 4 | 0.02 | 0.1 | 2500 | 2500 | 5.0 | 1.0 |
| Example 5 | 0.02 | 0.1 | 2200 | 5000 | 5.0 | 2.3 |
| Example 6 | 0.04 | 0.14 | 2200 | 5000 | 3.5 | 2.3 |
| Comparative Example 1 | 0.04 | 0.02 | 2500 | 2500 | 0.5 | 1.0 |
| Comparative Example 2 | 0.02 | 0.02 | 2500 | 1250 | 1.0 | 0.5 |
| Comparative Example 3 | 0.02 | 0.14 | 2500 | 2500 | 7.0 | 1.0 |
| Comparative Example 4 | 0.02 | 0.1 | 2500 | 1250 | 5.0 | 0.5 |
| Comparative Example 5 | 0.02 | 0.02 | 2200 | 7000 | 1.0 | 3.2 |
| Comparative Example 6 | 0.04 | 0.02 | 2200 | 5000 | 0.5 | 2.3 |
| Comparative Example 7 | 0.02 | 0.14 | 2200 | 7000 | 7.0 | 3.2 |
| Comparative Example 8 | 0.005 | 0.02 | 2200 | 55000 | 4.0 | 2.5 |
| Comparative Example 9 | 0.05 | 0.24 | 2200 | 5000 | 4.8 | 2.3 |

TABLE 2

| | Transfer of concavo-convex shape to film | Outer appearance of wound body | Optical film | Back surface layer film | Base material | Additive diameter (μm) |
|---|---|---|---|---|---|---|
| Example 1 | Absent | Good | Film 1 | Back surface layer film 1 | PET | 5.0 |
| Example 2 | Absent | Good | Film 2 | Back surface layer film 2 | PP | 1.5 |
| Example 3 | Absent | Good | Film 1 | Back surface layer film 3 | PET | 1.5 |
| Example 4 | Absent | Good | Film 2 | Back surface layer film 4 | PP | 10.0 |
| Example 5 | Absent | Good | Film 1 | Back surface layer film 5 | PET | 10.0 |
| Example 6 | Absent | Good | Film 5 | Back surface layer film 12 | PET | 16.0 |
| Comparative Example 1 | Absent | Gauge band | Film 3 | Back surface layer film 2 | PP | 1.5 |
| Comparative Example 2 | Absent | Winding wrinkle | Film 2 | Back surface layer film 6 | PP | 1.5 |
| Comparative Example 3 | Present | Good | Film 2 | Back surface layer film 7 | PP | 16.0 |
| Comparative Example 4 | Absent | Winding wrinkle | Film 2 | Back surface layer film 8 | PP | 10.0 |

TABLE 2-continued

| | Transfer of concavo-convex shape to film | Outer appearance of wound body | Optical film | Back surface layer film | Base material | Additive diameter (μm) |
|---|---|---|---|---|---|---|
| Comparative Example 5 | Present | Good | Film 1 | Back surface layer film 9 | PET | 1.5 |
| Comparative Example 6 | Absent | Gauge band | Film 4 | Back surface layer film 10 | PET | 1.5 |
| Comparative Example 7 | Present | Good | Film 1 | Back surface layer film 11 | PET | 16.0 |
| Comparative Example 8 | Absent | Gauge band | Film 6 | Back surface layer film 3 | PET | 1.5 |
| Comparative Example 9 | Absent | Good | Film 7 | Back surface layer film 13 | PET | 30.0 |

As clear from the results of Tables 1 and 2, in the wound body of the multilayer film with values of R1, R2, M1, and M2 satisfying the relationships prescribed in the present invention, a defect in terms of outer appearance was not observed, and transfer of the concavo-convex shape to a surface of the optical film was not observed.

In contrast, in the cases where the ratio of the three-dimensional center-line average roughness R2 of the back surface of the protective film relative to the three-dimensional center-line average roughness R1 of the back surface of the optical film was larger than the range prescribed in the present invention (Comparative Examples 3 and 7), in the cases where the tensile elastic modulus M2 in the lengthwise direction of the protective film relative to the tensile elastic modulus M1 in the lengthwise direction of the optical film was larger than the range prescribed in the present invention. (Comparative Examples 5 and 7), and in the case where the ratio of the three-dimensional center-line average roughness R2 of back surface of the protective film was out of the range prescribed in the present invention (Comparative Example 9), transfer of the concavo-convex shape to the surface of the optical film was observed. In the cases where the ratio of the three-dimensional center line average roughness R2 of the back surface of the protective film relative to the three-dimensional center-line average roughness R1 of the back surface of the optical film was smaller than the range prescribed in the present invention (Comparative Examples 1 and 6), and in the case where the three-dimensional center-line average roughness R1 of the back surface of the protective film was out of the range prescribed in the present invention (Comparative Example 8), a gauge band occurred, and the outer appearance of the wound body was deteriorated. In the cases where the tensile elastic modulus M2 in the lengthwise direction of the protective film relative to the tensile elastic modulus M1 in the lengthwise direction of the optical film was smaller than the range prescribed in the present invention (Comparative Examples 2 and 4), a winding wrinkle occurred, and the outer appearance of the wound body was deteriorated.

REFERENCE SIGNS LIST

10: wound body
100: multilayer film
120: optical film
110: protective film
120Y: surface on front side of optical film
120X: surface on back side of optical film
110Y: surface on front side of protective film
110X: surface on back side of protective film
122*a*: 'a' layer
121*b*: 'b' layer
123*b*: 'b' layer
112: adhesive layer
111: back surface layer
110Y: surface on front side of protective film
110X: surface on back side of protective film

The invention claimed is:

1. A long-length multilayer film comprising a long-length optical film and a long-length protective film that is releasable from the long-length optical film, wherein
the optical film has two major opposing surfaces including a first major surface proximal to the protective film and a second major surface distal to the protective film,
the second major surface of the optical film has a three-dimensional center-line average roughness R1,
the protective film has two major opposing surfaces including a first major surface proximal to the optical film and a second major surface distal to the optical film,
the second major surface of the protective film has a three-dimensional center-line average roughness R2,
the three-dimensional center-line average roughness R1 of the second major surface of the optical film, the three-dimensional center-line average roughness R2 of the second major surface of the protective film, a tensile elastic modulus M1 in a lengthwise direction of the optical film, and a tensile elastic modulus M2 in a lengthwise direction of the protective film satisfy all of the relationships of the following formulae (1) to (6):

$$0.01 \ \mu m \leq R1 \leq 0.05 \ \mu m \tag{1},$$

$$0.01 \ \mu m \leq R2 \leq 0.2 \ \mu m \tag{2},$$

$$1{,}500 \ MPa \leq M1 \leq 3{,}000 \ MPa \tag{3},$$

$$2{,}500 \ MPa \leq M2 \leq 6{,}000 \ MPa \tag{4},$$

$$1.0 \leq R2/R1 \leq 5.0 \tag{5), and}$$

$$1.0 \leq M2/M1 \leq 3.0 \tag{6}$$

the optical film is a multilayer film having a layer structure of 'b' layer/'a' layer/'b' layer,
the 'a' layer is a layer formed from a resin containing a polystyrene-based polymer, and
the 'b' layer is a layer formed from a resin containing a poly(methyl methacrylate) polymer.

2. The multilayer film according to claim 1, wherein the optical film has a thickness of 15 to 50 μm.

3. The multilayer film according to claim 1, wherein the protective film includes an adhesive layer and a back surface layer, wherein the adhesive layer defines the first major surface of the protective film, and wherein the back surface layer defines the second major surface of the protective film.

4. The multilayer film according to claim 3, wherein the back surface layer is a layer formed from a resin containing a polymer and the resin contains particles.

5. The multilayer film according to claim 4, wherein a ratio of the particles in a total amount of the resin forming the back surface layer is 0.05% by weight or more and 1.0% by weight or less.

6. The multilayer film according to claim 4, wherein the particles have a particle diameter of 0.01 to 10 μm.

7. The multilayer film according to claim 3, wherein the back surface layer has a thickness that satisfies a ratio of a thickness of the adhesive layer relative to that of the back surface layer (adhesive layer/back surface layer) of 1/40 or more and 1/1 or less.

8. A wound body formed by winding the multilayer film according to claim 1 into a roll shape.

\* \* \* \* \*